United States Patent

[11] 3,615,340

[72] Inventors Beverly B. Fuqua;
William J. Metrailer; Marnell A. Segura; Earl E. Turner, all of Baton Rouge, La.
[21] Appl. No. 776,628
[22] Filed Nov. 18, 1968
[45] Patented Oct. 26, 1971
[73] Assignee Esso Research and Engineering Company

[54] QUENCHING AND PASSIVATION OF PARTICULATE METALS
10 Claims, 1 Drawing Fig.

[52] U.S. Cl. .................................................. 75/0.5 BA, 75/26
[51] Int. Cl. .................................................. B22f 9/00, C21b 13/00
[50] Field of Search .......................................... 75/0.5, 26

[56] References Cited
UNITED STATES PATENTS

| 2,578,800 | 12/1951 | Hamister ...................... | 75/0.5 |
| 2,766,108 | 10/1956 | Eberhart et al. ............... | 75/0.5 |
| 3,199,974 | 8/1965 | Johnson et al. ................ | 75/0.5 |
| 3,347,659 | 10/1967 | Volk et al. ..................... | 75/26 |

Primary Examiner—L. Dewayne Rutledge
Assistant Examiner—W. W. Stallard
Attorney—Manahan and Wright ABSTRACT: A process is disclosed for rendering active particles of reduced iron ores resistant to oxidation by treating the particles in a fluidized bed at elevated temperatures with mildly oxidizing gases.

PATENTED OCT 26 1971
3,615,340
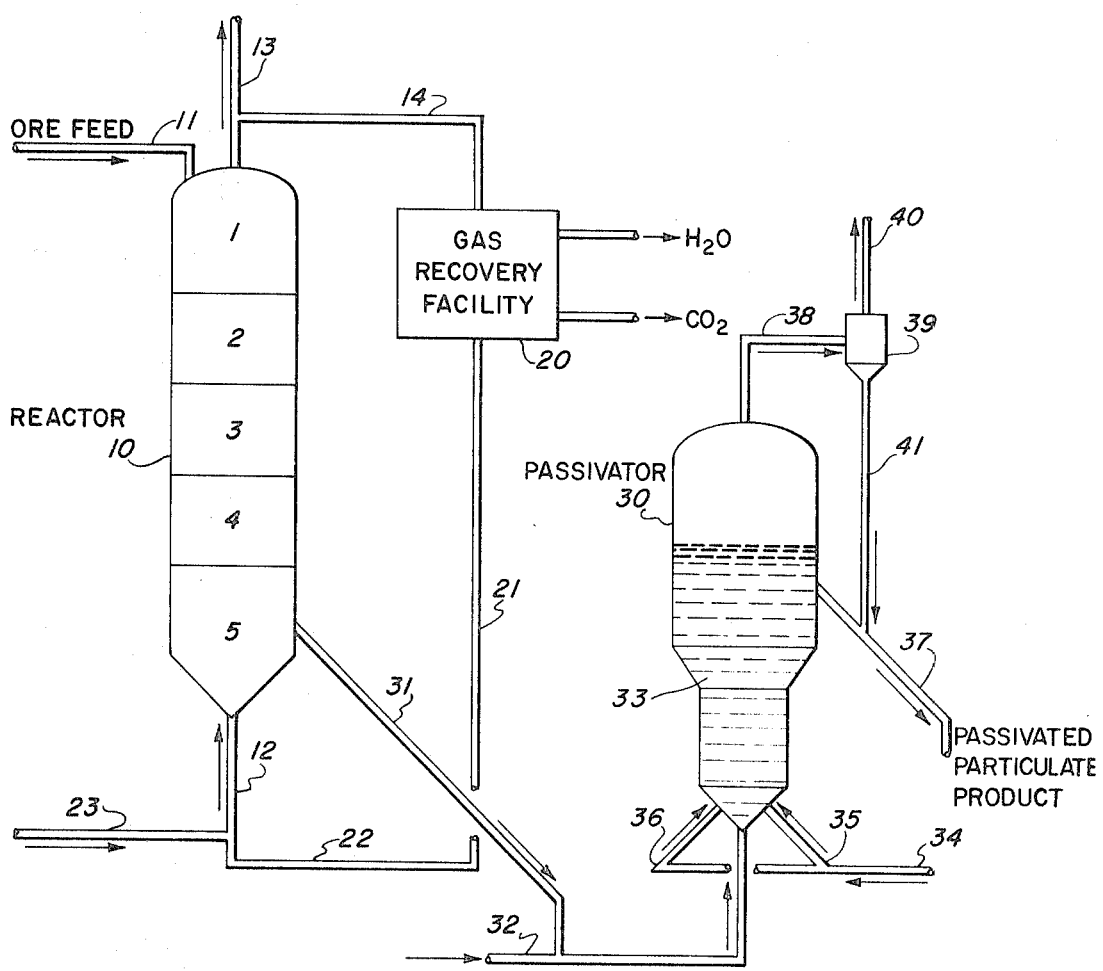
B. B. Fuqua
W. J. Metrailer  Inventors
M. A. Segura
E. E. Turner

QUENCHING AND PASSIVATION OF PARTICULATE METALS

BACKGROUND OF THE INVENTION

This invention relates to the art of passivating particulate metals, particularly ferrous metals, by forming protective films, surfaces or coatings on such metals.

There has been a longfelt need in the art for methods of cooling and passivating particulate forms of metals. This is particularly true in the iron and steel industry where, for example, direct ore reduction processes are becoming of increasing interest. In a direct reduction process, metallic iron is produced by subjecting iron ore, at temperatures below the melting point of the ore, to direct contact with hot reducing gas, or reducing gas mixtures.

Powdered metals withdrawn from direct iron ore reduction processes are highly active in varying degrees and readily chemically react when exposed to various environments. For example, powdered iron produced by reducing iron oxides with hydrogen-rich gases at relatively low temperatures tend to be highly pyrophoric and such product will burn if directly exposed to air or other oxygen-containing gas, even at relatively low temperatures. Iron ores that are reduced at relatively low hydrogen concentrations and high temperatures tend to be less pyrophoric on initial exposure but still possess and acute tendency, even after cooling, to be quite reactive. The metal can become severely reoxidized, or back-oxidized, on continued exposure to an oxygen-containing gas, thus greatly decreasing its value. Moreover, when the reduced iron product is dampened or wetted, as by atmospheric moisture, rain or spray, the problem can become even more serious because hydrogen can be liberated. The hydrogen can, under certain circumstances, ignite to produce fires.

Two reactions are believed primarily responsible for the oxidation, and ignition, of a reduced iron product. A first reaction, which is only slightly exothermic, involves reaction between iron and water to produce iron oxides and hydrogen, as represented by the equations:

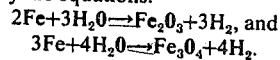
$$2Fe + 3H_2O \rightleftharpoons Fe_2O_3 + 3H_2, \text{ and}$$
$$3Fe + 4H_2O \rightleftharpoons Fe_3O_4 + 4H_2.$$

The second reaction, which is highly exothermic, involves reaction between iron and oxygen to ultimately form iron oxides as represented by the following equations:

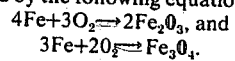
$$4Fe + 3O_2 \rightleftharpoons 2Fe_2O_3, \text{ and}$$
$$3Fe + 2O_2 \rightleftharpoons Fe_3O_4.$$

Fires may be caused when the reduced particulate iron product is stored under circumstances such that the heat generated by the foregoing reactions cannot be sufficiently rapidly dissipated. Eventually, the heat generated from he hydrogen generation reaction builds up until the temperature reaches a point where the air oxidation of iron becomes the controlling reaction. The latter reaction, being strongly exothermic may ignite the hydrogen, the combustion of which liberates still more heat, which sustains and increases the rate of the oxidation reaction. Under these conditions, the reactions can continue until essentially all of the metallic iron has been rapidly back-oxidized to iron oxides.

Because of these and other difficulties, the particulate reduced iron product is generally compressed into dense compositions such as briquettes, pellets or extrudates. This lessens the exposure area, reduces the amount of back-oxidation, and decreases the possibility of fires though it by no means completely solves the problem unless very high densities are achieved. Often, also, numerous various additives are incorporated with the particulate reduced iron product at or prior to the time of compacting. The compacted product can also be surface coated to lessen the exposure to moisture and oxygen.

The production of a passivated particulate reduced iron product suitable for handling and shipping is a very desirable objective and would represent a great stride forward in the art. Attempts have been made to passivate the particulate reduced iron product from direct iron ore reduction processes and thus avoid the necessity of compacting the particles, but these attempts have not generally been successful. Where such efforts have been made to passivate the particulate product, the powdered metal is often heated in an inert, nonoxidizing, or reducing gas atmosphere. Thus, e.g., fresh reducing gases are contacted with the reduced iron, while careful efforts are made to avoid gas dilution or contact with air which might make the circulating gas oxidizing toward metallic iron. After sufficient cooling in such atmosphere, to lessen the detrimental effects back-oxidation upon exposure to air, the product is withdrawn.

The foregoing and other disadvantages and difficulties associated with handling and shipping such powdered metal products are known to the art. It has long been felt desirable to develop more effective ways and means of quenching and passivating hot, active powdered metals, particularly ferrous metals such as those produced in direct iron ore reduction processes.

It is, accordingly, the primary objective of the present invention to provide a method for passivating particulate metals. In particular, it is an object to obviate the foregoing and other disadvantages by providing a method for passivating active metals and for quenching, cooling, and passivating such metals by forming protective films on the metals while in particulate form, especially ferrous metals. More particularly, it is an object to render particulate metals passive and resistant to back-oxidation so that they can be handled and stored. More particularly, it is an object to provide method for passivation of ferrous metals produced by direct reduction processes, especially fluidized iron ore reduction processes.

SUMMARY OF THE INVENTION

These and other objects are achieved in accordance with the present invention which contemplates a new and improved process for passivating, or quenching and passivating, active metal particles of reduced iron ores by forming a bed of the particles, fluidizing the bed with a mildly oxidizing gas such as steam, or oxygen diluted with steam, or with inert gases such as nitrogen mixed with oxidizing gases such as steam or oxygen, or both, and maintaining the fluidized bed at temperatures ranging from about 90° F. to about 650° F., preferably about 150° F. to about 450° F., for a time sufficient to form a protective oxide coating on the particles. When the metal particles are introduced into the fluid bed at much higher temperatures, it is necessary to quench the particles to maintain bed temperatures within the desired range. This is achieved by contacting the bed with spray of atomized water. Preferably, the sizes of the droplets of water range less than about one-eighth inch in diameter, and more preferably less than about one thirty-sixth inch in diameter. When such water spray quenching is used, the temperature of the fluidized bed must be maintained at from about 25° F. to about 200° F., and preferably from about 50° to about 100° F., above the condensation temperature of the water under the conditions of operation.

In its preferred form, reduced iron products, of a fluidizable particle size distribution ranging principally about 10 to 10,000 microns, averaging about 50 to 400 microns, at temperatures ranging from about 1000° F. to about 1800° F., and preferably from about 1300° F. to about 1600° F., are injected directly into a fluidized bed of the product. The particles can be injected mechanically, e.g., using hoppers, screw feeders and the like, or pneumatically by entrainment in inert, mildly oxidizing, or even reducing, gases. (When reducing gases are used, the volume must be insufficient to render the overall fluid bed gas composition nonoxidizing with respect to the metal surfaces of the particles.) At the normally desired operating pressures which range as high as about 250 pounds per square inch, the bed is operated at temperatures ranging from about 225° F. to about 600° F., and preferably from about 250° F., to about 450° F. Pursuant to these conditions, the particulate metal is quenched or cooled by the water spray without condensation on the surfaces.

Passivation of the particles is achieved by a thin film or surface coating of oxides believed to be substantially magnetite, i.e., $Fe_3O_4$, or magnetic oxide of iron which is formed by contact of the particles with mildly oxidizing fluidizing gases. The thin film, which aids in protecting the particles against further back-oxidation, results from deliberate partial reoxidation ranging up to about 3.0 percent, based on the total weight of the particles. Generally, excellent passivation is achieved when such partial reoxidation is carried out to the extent of about 0.1 to 1.0 percent.

In general, fluidization is maintained by injecting a gas which is mildly oxidizing to the metal particle surfaces under conditions existing in the fluid bed. Preferably, fluidization is maintained with steam or mixtures of steam and oxygen, or inert gases in mixtures with steam or oxygen, or both. To avoid excessive reoxidation, the gases should contain no more than about 12 percent, and preferably about 1 percent to 8 percent by volume, of free oxygen. If hot metal particles are added to the fluid bed directly from a high temperature reduction process, the temperature rises and water is injected through an atomizer into the bottom of the bed to maintain the desired bed temperature. The vaporized droplets form steam which adds to the fluidizing gas.

The holding time of the reduced ore particles in the bed is sufficiently short to prevent excessive oxidation. Holding times range generally from about 5 minutes to about 1 hour, and preferably from about 10 minutes to about 40 minutes, depending upon the temperature and concentration of oxidizing constituents in the fluidizing gases. In this manner, the reduced iron particles are quenched and made less reactive upon subsequent exposure to conditions which would otherwise produce excessive back-oxidation.

In introducing the water into the fluidized bed for quenching of the particulate metal it is essential that the water be in liquid state, preferably in the form of relatively fine droplets. The droplets are generally formed and introduced as a fine spray, preferably by atomizing in a stream of gas, most preferably fluidizing gas.

These and other features will be better understood by reference to the accompanying schematic flow diagram to which reference is made in the following detailed description

BRIEF DESCRIPTION OF THE DRAWING

Referring to the drawing, there is illustrated a fluidized iron ore reduction process, and process combination, of a preferred type for passivating reduced ore particles.

DESCRIPTION OF THE PREFERRED EMBODIMENTS

Referring specifically to the drawing, the combination contemplates a reactor 10 wherein oxidic iron ores are reduced by countercurrent contact with ascending reducing gases. A gas regeneration and recovery facility 20 is also shown, this providing for the recovery of spent reducing gas. A passivator 30 provides for the passivation, or cooling and passivation, of the particulate reduced iron product withdrawn from reactor 10.

In the iron ore reduction portion of the process, oxidic iron ore, e.g., hematite, is charged into the top stage, i.e., stage 1, of reactor 10 via line 11. The iron oxides descend through, and are progressively reduced in the sequence of stages 1, 2, 3, 4, and 5, each of which contains one or more beds of fluidized ore at progressively decreasing degrees of oxidation, The individual beds or stages are operated at the same or at different elevated temperatures ranging generally from about 1000° F. to about 1800° F., or more generally from about 1300° F. to about 1600° F., particularly in the ferrous reduction stages. In the first stage, or stages, the oxides are generally preheated. Fuel can be burned with oxygen, e.g., in the top bed or second bed to accomplish this, under oxidizing or reducing conditions. The oxides are thence reduced from the ferric oxide state to magnetic oxide of iron and in a subsequent stage, or stages, from magnetic oxide of iron to ferrous oxide. Finally, in the last stage, or stages, the ore is reduced from ferrous oxide to substantially metallic iron. In the final reduction stage the reduced iron product is generally from about 50 to about 95 percent metallized.

Reducing gas is introduced into reactor 10 countercurrent to the flow of ore. Hot ascending reducing gas, consisting generally of carbon monoxide or hydrogen, or both, is thus introduced into the bottom of reactor 10 via line 12, the gas sequentially contacting fluidized beds in stages 5 through 1. Cyclone separators (not shown) are generally provided between the beds to remove entrained particles from the ascending fluidizing gas.

Spent gas is withdrawn from reactor 10 via line 13. The gas can be vented, but preferably most of the gas is regenerated by removal of the oxidized components, generally water and carbon dioxide. The gas is thus regenerated by passage through line 14 to the recovery facility 20 where water is precipitated and removed by cooling and the remaining gas is scrubbed, e.g., with basic compounds such as monoethanolamine, to remove carbon dioxide. The regenerated gas is then passed via lines 21 and 22, combined with fresh reducing gas from line 23, reheated via means not shown, and thence injected via line 12 into the bottom of reactor 10.

Particulate iron metal solids are withdrawn from the last stage of reactor 10, i.e., stage 5, via line 31. The particulate metal, of particle sizes averaging generally from about 50 to about 400 microns, and as large as about 14 mesh (Tyler Series), is discharged into line 32, wherein it is entrained by a fluidizing gas stream and thence fed into the bottom of passivator 30.

The particulate metal solids are introduced at high temperatures into the lower part of fluidized bed 33 in passivator 30. The bed is in a generally turbulent fluidized state, and the solids are there contacted by an atomized spray of water introduced into the bottom of passivator 30 via lines 34, 35, and 36. Upon introduction into the fluid bed 33, the solids are instantly quenched and the water droplets are vaporized to form steam. The lower portion of the passivator 30 is characterized as preferably having a section having a length:diameter ratio ranging generally from about 2:1 to about 6:1, and more preferably from about 3:1 to about 4:1, to provide a relatively high velocity gas, ranging generally from about 1 foot per second to about 5 feet per second, and preferably from about 2 feet per second to about 3 feet per second, for creation of turbulence. The velocity of the gases through the upper portion of bed 33 ranges from about one-tenth to about one-half this velocity, and preferably from about one-fourth to about one-fifth this velocity.

The solids, after entry into the lower portion of quench passivator 30, are passed into the upper portion of fluidized bed 33. The passivated particulate product, after sufficient holdup time, is removed from the upper portion of fluidized bed 33 via overflow line 37 as a passivated dry particulate product.

Effluent gases are removed from the quench passivator 30 via line 38 and introduced into the cyclone separator 39. Gases from the cyclone separator 39 are exhausted via line 40, and the entrained solids are recovered by return through line 41 to line 37 from whence they are recovered as a portion of the passivated particulate metallic iron product. Alternatively, the solids from the cyclone can be recycled to the passivator if additional passivation is required.

The following examples are illustrative of the effectiveness of preparing a passivated particulate product from the above-described process.

EXAMPLE 1

Particulate reduced iron ore 95.0 percent metallized is withdrawn from the final stage of the reactor 10 at 1400° F. and entrained in a gaseous mixture of nitrogen containing 4 volume percent oxygen and injected into the bottom of the passivator 30, maintained at essentially atmospheric pressure. The metal is there contacted by an atomized spray comprising 67 percent water and 33 percent nitrogen. The iron particles are quenched to fluid bed temperatures of about 420° F. while the water droplets are instantly vaporized to steam, which comprises about 30 percent of the total fluidizing gases. After a holdup time of 16 minutes at 420° F., the dry particulate product is discharged from the fluidized bed of the passivator. It is then cooled to atmospheric temperature in nitrogen. The oxide coating on the product is sufficiently thin that metallization is reduced by only 0.3 percent to 94.7 percent.

To determine the degree of passivity of the so-treated particles, analyses are performed to measure the amount of hydrogen generated, upon immersion in water, and metallization loss upon exposure to the atmosphere for three days. The hydrogen generation measurements are calculated on the basis of standard cubic feet of hydrogen generated per hour per ton of reduced iron product, upon immersion in water, at 125° F. Analyses are also performed on an untreated or unquenched portion of the product taken directly from line 31 and cooled gradually in reducing gas to ambient temperature. Comparisons of the results are made. In accordance therewith, it is found that considerably less hydrogen is liberated by the quenched passivated metal, which also loses much less metallization. This is shown by reference to the data given in the following table, wherein treatment "A" refers to the unpassivated product and treatment "B" refers to the passivated product.

| Treatment | Metallization Loss | Hydrogen Generation |
|---|---|---|
| A | 3–4% | 11.1 SCFH/Ton |
| B | 0.3% | 0 |

Example 2

| Treatment | Metallization Loss | Hydrogen Generation |
|---|---|---|
| A | 3–4% | 11.1 SCFH/Ton |
| B | 0.3% | 0 |

EXAMPLE 2

Particulate iron of 88.0 percent metallization is withdrawn from the final stage of the reactor 10 and entrained in essentially pure nitrogen and injected into the bottom of passivator 30 at essentially atmospheric pressure. Therein it is treated precisely as in example 1, except that it is held for 46 minutes in the fluid bed at 409° F. Comparison of unpassivated and passivated samples, "A" and "B," again show the excellent passivation achieved by the method of the present invention.

| Treatment | Metallization Loss | Hydrogen Generation |
|---|---|---|
| A | 3–4% | 11.0 SCFH/Ton |
| B | 0.4% | 0.4 |

EXAMPLES 3 and 4

These examples illustrate the effectiveness of the present invention even when the water spray quench is not used.

Samples of reduced iron ore previously prepared and cooled in an inert atmosphere are introduced through a conventional lock hopper into passivator 30. The articles are heated and fluidized by a preheated fluidizing gas consisting of nitrogen and oxygen under conditions and for times indicated below. As the following table indicates, excellent passivation is achieved:

| Example No. | 3 | 4 |
|---|---|---|
| Fluidizing Gas | $N_2$+4.5% $O_2$ | $N_2$+8% $O_2$ |
| Fluid Bed Temp. | 357° F. | 217° F. |
| Holding Time, Minutes | 44 | 50 |
| Product Metallization, % | | |
| Before Passivation | 94.8 | 96.0 |
| After Passivation | 94.4 | 96.0 |
| Metallization Loss | 0.4 | (less than 0.1) |
| Hydrogen Generation, SCFH/Ton | | |
| Before Passivation | 17.6 | 7.9 |
| After Passivation | 0.0 | 0.0 |

In sharp contrast to the foregoing, when samples are treated in the passivator in precisely the same manner, but without any oxygen in the nitrogen, the resulting product is extremely active, generating hydrogen at essentially the same rate as the untreated samples.

EXAMPLE 5

Reduced iron ore is prepared, and a portion of it is passivated essentially as in example 4. The unpassivated portion is dumped into a conical-shaped pile, exposed to the atmosphere, initially at a temperature of 120° F. The passivated portion is dumped at 210° F. into an adjacent pile virtually identical in size and shape. Both piles are penetrated at several points with thermocouple probes. Oxidation generates heat and causes increased temperatures in the unpassivated pile, while no increase is seen in the passivated pile, as shown below:

| Pile | Temperature, °F. | | Metallization, % | |
|---|---|---|---|---|
| | Initial | Maximum | Initial | After 3 Days |
| Unpassivated | 120 | 240 | 96.1 | 92.9 |
| Passivated | 210 | 210 | 96.1 | 96.0 |

EXAMPLE 6

Reduced iron ore is prepared, and a portion of it is passivated essentially as in example 1. The unpassivated and passivated portions are subdivided into smaller portions of equal size, which are preheated with dry nitrogen to various initial temperatures and dumped into identical PILES. The piles are equipped with thermocouples and the temperatures are continuously recorded to observe the effect of any back-oxidation. The results are given below:

| Sample | Initial Temp. | Maximum Temp. |
|---|---|---|
| Unpassivated | 90° F. | 170° F. |
| | 120° F. | 240° F. |
| Passivated | 220° F. | 380° F. |
| | 175° F. | 175° F. |
| | 230° F. | 230° F. |
| | 240° F. | 240° F. |

The advantages gained by the present process are apparent.

The advantages gained by the present process are apparent.

It is apparent that the invention is subject to various changes and modifications without departing its spirit and scope.

Having described the invention, what is claimed is:

1. A process for passivating active metal particles of reduced iron ore comprising:
   forming a bed of the particles;

fluidizing the bed with a mildly oxidizing gas selected from the group consisting of steam, steam diluted with inert gas, oxygen diluted with inert gas, oxygen diluted with steam, and mixtures of these gases; and maintaining the bed at temperatures ranging from about 90° F. to about 650° F. for a time sufficient to form a protective oxide coating on the particles.

2. The process of claim 1, wherein said bed temperatures range from about 150° F. to about 450° F.

3. The process of claim 1 wherein said metal particles are continuously added to said bed at temperatures above about 650° F. and are quenched to bed temperatures ranging from about 225° F. to about 600° F., by spraying liquid water into said bed.

4. The process of claim 3, wherein said particles are quenched to temperatures ranging from about 250° F. to about 450° F.

5. The process of claim 3, wherein said particles of reduced ore are introduced into said bed at temperatures ranging from about 1000° F. to about 1800° F. and comprise principally particles ranging from about 10 to about 10,000 microns, averaging about 50 to about 400 microns, in size.

6. The process of claim 1, wherein up to about 3.0 percent of the metal in said particles is reoxidized to form an oxide film which protects the particles against further oxidation.

7. The process of claim 6 wherein from about 0.1 percent to about 1.0 percent of said metal is reoxidized.

8. The process of claim 2 wherein said mildly oxidizing gas contains up to about 12 volume percent free oxygen.

9. The process of claim 8 wherein said mildly oxidizing gas contains about 1 to about 8 percent free oxygen.

10. The process of claim 1 wherein said particles are maintained in said bed for holding times ranging from about 5 minutes to about 1 hour.